US012600034B2

(12) United States Patent　　(10) Patent No.:　　US 12,600,034 B2
Naderer　　(45) Date of Patent:　　Apr. 14, 2026

(54) COMPENSATION OF POSITIONAL TOLERANCES IN THE ROBOT-ASSISTED SURFACE MACHINING

(71) Applicant: FerRobotics Compliant Robot Technology GmbH, Linz (AT)

(72) Inventor: Ronald Naderer, Linz (AT)

(73) Assignee: FerRobotics Compliant Robot Technology GmbH, Linz (AT)

( * ) Notice: Subject to any disclaimer, the term of this patent is extended or adjusted under 35 U.S.C. 154(b) by 335 days.

(21) Appl. No.: 17/616,895

(22) PCT Filed: Jun. 4, 2020

(86) PCT No.: PCT/AT2020/060224
§ 371 (c)(1),
(2) Date: Dec. 6, 2021

(87) PCT Pub. No.: WO2020/243762
PCT Pub. Date: Dec. 10, 2020

(65) Prior Publication Data
US 2022/0314442 A1　　Oct. 6, 2022

(30) Foreign Application Priority Data

Jun. 7, 2019　(DE) ......................... 102019115562.2

(51) Int. Cl.
*B25J 9/16*　　　(2006.01)
(52) U.S. Cl.
CPC ................................... *B25J 9/1641* (2013.01)

(58) Field of Classification Search
CPC .... B25J 9/1641; B25J 9/1628; B25J 15/0019; B25J 17/0208; B25J 11/0065;
(Continued)

(56) References Cited

U.S. PATENT DOCUMENTS 2,894,546 A * 7/1959 Eschenburg ............ B24B 27/00
4,292,699 A * 10/1981 Szabo ....................... B24B 3/34
(Continued)

FOREIGN PATENT DOCUMENTS

CN　　104816307 A　　8/2015
DE　　　2320349 A1　12/1974
(Continued)

OTHER PUBLICATIONS

Machine Translation of Barbarit et al (FR-3033511-B1), "Surface Treatment System", Published on Aug. 16, 2019 (Year: 2019).*
(Continued)

*Primary Examiner* — Adam R Mott
*Assistant Examiner* — Ellis B. Ramirez
(74) *Attorney, Agent, or Firm* — Murphy, Bilak & Homiller, PLLC

(57) ABSTRACT

A device for robot-assisted machining of surfaces is described below. According to an example, the device has a retainer with a base plate designed for mounting on a manipulator and has an assembly suspended on the retainer, the assembly comprising a machine tool. The retainer has a tilt mechanism which couples the assembly to the retainer in such a way that the assembly can be tilted relative to the base plate about two axes of rotation, wherein the two axes of rotation can intersect with one another and run through the assembly below the base plate.

17 Claims, 5 Drawing Sheets

(58) Field of Classification Search

CPC ................ B25J 9/1633; B25J 17/0275; G05B 2219/39177; G05B 2219/45062; B24B 23/02; B24B 27/0038; B24B 49/04; B24B 49/16; B24B 23/022; G01B 21/00

USPC ................ 700/254; 451/9, 12; 901/32, 41, 7

See application file for complete search history.

(56) References Cited

U.S. PATENT DOCUMENTS

| | | | |
|---|---|---|---|
| 5,509,848 A | 4/1996 | Shimbara | |
| 6,241,594 B1 * | 6/2001 | Lepold | B25F 5/026 |
| 2014/0005831 A1 * | 1/2014 | Naderer | B25J 11/0065 |
| | | | 700/258 |
| 2014/0305217 A1 | 10/2014 | Tapia et al. | |
| 2016/0096245 A1 | 4/2016 | Ramirez Alcala et al. | |
| 2016/0184992 A1 * | 6/2016 | Naderer | B25J 9/1687 |
| | | | 700/218 |

FOREIGN PATENT DOCUMENTS

| | | | | |
|---|---|---|---|---|
| DE | 102009002005 A1 * | 10/2010 | ............. | G01B 21/00 |
| DE | 102010003697 A1 | 10/2011 | | |
| DE | 102012108126 A1 * | 3/2014 | ............. | B24B 27/04 |
| EP | 1961515 A1 * | 8/2008 | ............. | B23Q 1/70 |
| EP | 2190627 B1 | 4/2012 | | |
| EP | 2498956 B1 * | 6/2014 | ......... | B25J 17/0275 |
| EP | 2960014 A2 | 12/2015 | | |
| FR | 3033511 A1 | 9/2016 | | |
| JP | S5012690 A | 2/1975 | | |
| JP | H0332583 A | 2/1991 | | |
| JP | H03281189 A | 12/1991 | | |
| JP | 2675448 B2 * | 11/1997 | ............. | B23B 51/00 |
| JP | 2004169901 A * | 6/2004 | | |
| WO | 2007014732 A2 | 2/2007 | | |
| WO | 2018065408 A1 | 4/2018 | | |

OTHER PUBLICATIONS

Machine Translation of Manfred Neumeier (EP-1961515-A1), "Coupling Device For A Tool Holder Or Workpiece Clamps", Published on Aug. 27, 2008 (Year: 2008).*

* cited by examiner

Manipulator 1

Joint 3a
(2-axis)

Joint 3b
(1-axis)

Longitudinal axis A

TCP

Segment 2b

Actuator 20

Segment 2a

Grinding machine 10

Grinding plate 12

Joint 3c
(2-axis)

Segment 2c

Segment 2d

Grinding disk 11

Workpiece 40

Controller 4

Base 41

TCP trajectory x(t)

$x(t_0)$ $x(t_1)$ $x(t_2)$ $a(t_0)$ $a_c = a(t_1)$

20

20

20

10

10

10

Surface S $\phi$ $\phi = \tan^{-1}(\Delta a / \Delta x)$ $\Delta x = x(t_1) - x(t_0)$ $\Delta a = a(t_1) - a(t_0)$ Actuator 53 (extended)

COMPENSATION OF POSITIONAL TOLERANCES IN THE ROBOT-ASSISTED SURFACE MACHINING

TECHNICAL FIELD

The present invention relates to the field of robotics and in particular robot-assisted machining of workpiece surfaces.

BACKGROUND

In robot-assisted surface machining, a machine tool such as, e.g., a grinding or polishing machine (e.g., an electrically operated grinding machine with rotating grinding disk as grinding tool) is guided by a manipulator, e.g., an industrial robot. Here, the machine tool can be coupled in various ways to the so-called TCP (Tool Center Point) of the manipulator; as a rule, the manipulator can adjust the position and orientation of the machine practically in any manner, and move the machine tool, for example, on a trajectory parallel to the surface of the workpiece. Industrial robots are usually position-controlled, which enables precise movement of the TCP along the desired trajectory.

In order to achieve a satisfactory result in the case of robot-assisted grinding, a closed-loop control of the process force (grinding force) is necessary in many applications, which often only with difficulty can be achieved with sufficient accuracy using conventional industrial robots. The large and heavy arm segments of an industrial robot have too high inertia for a closed-loop controller to be able to react quickly enough to variations of the process force. In order to solve this problem, between the TCP of the manipulator and the machine tool, a linear actuator, which is small in comparison with industrial robots, may be arranged, which couples the TCP of the manipulator to the machine tool. During surface machining, the linear actuator simply regulates the process force (i.e., the contact force between tool and the workpiece), while the manipulator moves the machine tool together with the linear actuator in a position-controlled manner along the desired trajectory.

There are situations in which the trajectory along which the manipulator moves the machine tool does not run parallel to the surface and consequently the effective direction of the linear actuator (and thus the direction of the process force) is not perpendicular to the workpiece surface. This angular deviation (deviation from the right angle with respect to the surface) can result in incorrect surface machining and diminished machining quality.

The aim of the inventors was to develop an improved device for robot-assisted surface machining and a related method.

SUMMARY

The above-mentioned aim is achieved by the device and the system described herein.

A device for robot-assisted machining of surfaces is described below. According to an example, the device has a retainer with a base plate designed for mounting on a manipulator, as well as an assembly suspended on the retainer and comprising a machine tool. The retainer has a tilt mechanism which couples the assembly to the retainer, such that the assembly may be tilted relative to the base plate about two axes of rotation, wherein the two axes of rotation may intersect with one another and extend through the assembly below the base plate.

According to another exemplary embodiment, the device comprises a retainer with a base plate designed for mounting on a manipulator, as well as an assembly suspended on the retainer and comprising a machine tool. The retainer has a tilt mechanism which couples the assembly to the retainer, such that the assembly may be tilted relative to the base plate about two axes of rotation, wherein the tilt mechanism has a stop collar, so that tilting about the two axes of rotation is possible only up to defined maximum angles, and wherein the tilt mechanism can be locked so that a tilting is blocked.

Moreover, a system for robot-assisted machining of surfaces is described. According to an exemplary embodiment, the system comprises a manipulator, an assembly with a machine tool, coupled to a tool center point (TCP) of the manipulator, and a controller for control of the movement of the TCP of the manipulator. The controller is designed to determine the angular deviation between a longitudinal axis of the machine tool and the normal of a workpiece surface, while a tool mounted on the machine tool contacts the workpiece surface. The control is further designed to adjust the orientation of the TCP on the basis of the determined angular deviation, such that the angular deviation becomes smaller.

According to another exemplary embodiment, the system comprises a manipulator and a device coupled to a TCP of the manipulator, which device has a retainer with a base plate designed for mounting on the manipulator, as well as a machine tool comprising an assembly suspended on the retainer. The retainer has a tilt mechanism, which couples the assembly to the retainer, such that the assembly may be tilted relative to the base plate about two axes of rotation, wherein the two axes of rotation can intersect and extend through the assembly below the base plate. The device further comprises sensors, which are designed to determine the tilt angle associated with the two axes of rotation.

BRIEF DESCRIPTION OF THE DRAWINGS

The invention is explained in more detail below with reference to the examples represented in the drawings. The representations are not necessarily true to scale, and the invention is not limited to the represented aspects. Instead, emphasis is placed on representing the underlying principles of the invention. In the drawings.

DETAILED DESCRIPTION

Before explaining in detail various exemplary embodiments of the present invention, an example of a robot-assisted grinding device will first be described. It is understood that the concepts described here are also applicable to other types of surface machining (e.g., polishing, milling, etc.) and are not limited to grinding.

Figure 1:
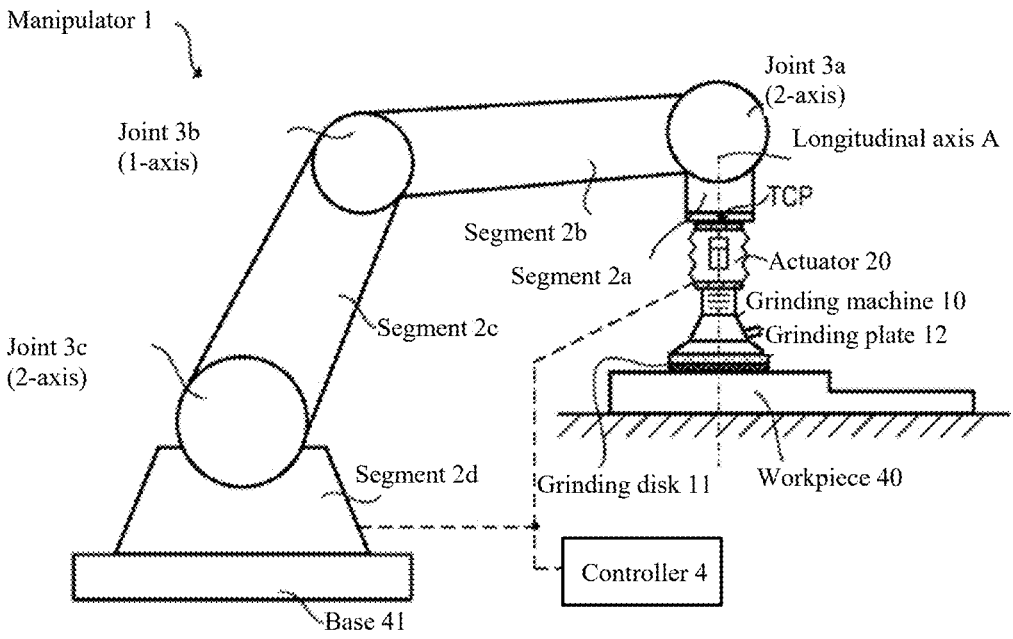
FIG. 1 illustrates an example of a robot-assisted grinding device.

According to FIG. 1, the device comprises a manipulator 1, for example, an industrial robot, and a grinding machine 10 with a rotating grinding tool (e.g., an orbital grinding machine), wherein the latter is coupled to the so-called tool center point (TCP) of the manipulator 1 via a compensation device 20, which in the present example is implemented as a linear actuator. Strictly speaking, the TCP is not a point but rather a vector and can be described, for example, by three space coordinates and three angles. In robotics, for the description of the orientation of the TCP, sometimes generalized coordinates (usually six joint angles of the robot) in the configuration space are sometimes also used. The position and orientation of the TCP are sometimes also referred to as "pose." More generally, the compensation device 20 is designed to compensate for changes in the position of the orientation of the TCP relative to the workpiece surface. Moreover, the compensation device 20 is designed to generate a process force between the machine tool (in the present example, the grinding machine 10) and the workpiece surface. In the simplest case, the compensation device 20 may be a spring. The aforementioned linear actuator enables precise control of the process force. For feedback control the compensation device 20 may contain a force measurement system, which is capable of measuring the process force. In the case of a pneumatic linear actuator, the force measurement system may have a pressure sensor, which measures the air pressure in the actuator, from which the process force can be determined (taking into consideration the characteristic of the actuator). However, a spring could also be combined with a load cell. In this case, the force control would have to be effected by the manipulator.

The function of the compensation device can also be provided by the manipulator itself, if said manipulator is capable of performing a force control. For this purpose, the robot as a rule needs force torque sensors and a correspondingly complex control.

In the case of an industrial robot with six degrees of freedom, the manipulator may be constructed of four segments 2a, 2b, 2c and 2d, which are each connected via joints 3a, 3b and 3c. The first segment is usually connected rigidly to the base 41 (but this does not necessarily have to be the case). The joint 3c connects the segments 2c and 2d. The joint 3c may be a 2-axis joint and enable a rotation of the segment 2c about a horizontal axis of rotation (elevation angle) and a vertical axis of rotation (azimuth angle). The joint 3b connects the segments 2b and 2c and enables a pivoting movement of the segment 2b relative to the position of the segment 2c. The joint 3a connects the segments 2a and 2b. The joint 3a can be a 2-axis joint and therefore (similarly to the joint 3c) allow a pivoting movement in two directions. The TCP has a fixed relative position with respect to the segment 2a, wherein this segment usually also comprises a rotational joint (not shown), which allows rotation about a longitudinal axis A of the segment 2a (shown in FIG.

1 as a dashed line, it corresponds to the axis of rotation of the grinding tool). An actuator which can bring about rotation about the respective joint axis is associated with each axis of a joint. The actuators in the joints are actuated by a robot control 4 according to a robot program. Different industrial robots/manipulators and associated open-loop controls are known per se and are therefore not further explained here.

The manipulator 1 is usually position-controlled, i.e., the robot control can establish the pose (location and orientation) of the TCP and move it along a predefined trajectory. In FIG. 1, the longitudinal axis of the segment 2a on which the TCP lies is designated by A. When the actuator 20 is in contact with an stop collar, the pose of the grinding machine 10 (and also of the grinding disk 11) is also defined by the pose of the TCP. As already mentioned at the beginning, the actuator 20 is used to adjust the contact force (process force) between the tool and the workpiece 40 to a desired value during the grinding process. Direct force control by the manipulator 1 is generally insufficiently precise for grinding applications, since, due to the high inertia of the segments 2a-c of the manipulator 1, rapid compensation of force peaks (e.g., when placing the grinding tool on the workpiece 40) is practically impossible with conventional manipulators. For this reason, the robot control 4 is designed to regulate the pose (position and orientation) of the TCP of the manipulator 1, while the closed-loop force control is performed exclusively by the actuator 20.

As already mentioned, during the grinding process, the contact force $F_K$ between grinding tool and workpiece 40 can be adjusted using the (linear) actuator 20 and a force control (which can be implemented, for example, in the control 4), such that the contact force $F_K$ (in the direction of the longitudinal axis A) between the grinding tool and the workpiece 40 corresponds to a predeterminable set point. The contact force $F_K$ is a reaction to the actuator force $F_A$ with which the linear actuator 20 presses against the workpiece surface. If there is no contact between the workpiece 40 and the tool, the actuator 20, as a result of the absence of a contact force on the workpiece 40, moves against an stop collar (not shown, since it is integrated in the actuator 20) and presses with a defined force against said stop collar. In this situation (i.e., no contact), the actuator displacement a is therefore at a maximum ($a=a_{MAX}$), and the actuator 20 is located in an (outer) end position.

The position control of the manipulator 1 (which may also be implemented in the controller control 4) may work completely independently of the force control of the actuator 20. The actuator 20 is responsible not for positioning the grinding machine 10 but only for adjusting and maintaining the desired contact force FK during the grinding process and for detecting contact between the tool and the workpiece. A contact can, for example, be detected simply in that the actuator has moved away from the end position (actuator displacement a is smaller than the maximum displacement aMAX at the stop collar).

The actuator can be a pneumatic actuator, e.g., a double-acting pneumatic cylinder. However, other pneumatic actuators can also be used such as, e.g., bellows cylinders and air muscles. As an alternative, electric direct drives (gearless) may also be an option. It is understood that the effective direction of the actuator 20 does not necessarily need to coincide with the longitudinal axis A of the segment 2a of the manipulator. In the case of a pneumatic actuator, the force control can be implemented in a per-se known manner using a control valve, a closed-loop controller (implemented in the controller 4) and a compressed air reservoir. Since, for taking into account the gravitational force (i.e., the weight of the grinding machine 10), the inclination to the vertical is relevant, the actuator 20 may include an inclination sensor. The measured inclination is taken into consideration by the force controller. The actual implementation of the force control is known per se and unimportant for the further explanation and is therefore not described in more detail.

Usually, the grinding machine 10 has an electric motor which drives the grinding wheel 11. In an orbital grinding machine, the grinding wheel 11 is mounted on a support plate (grinding plate 12) which in turn is connected to the motor shaft of the electric motor. As electric motors, asynchronous motors or synchronous motors can be considered. Synchronous motors have the advantage that the speed does not change with the load (only the slip angle does), whereas in asynchronous machines the speed drops with increasing load. The load of the motor is substantially proportional to the contact force $F_K$ and the friction between the grinding wheel 11 and the surface of the workpiece 40 to be machined.

As an alternative to grinding machines with electric drive, grinding machines with a pneumatic motor (compressed air motor) can also be used. Compressed air-operated grinding machines can be constructed relatively compactly, since compressed air motors usually have a low power-to-weight ratio. A closed-loop rotational speed control can be simply implemented by means of a pressure control valve (e.g., electrically actuated by the controller 4) (in addition or alternatively also by means of a throttle), whereas synchronous and asynchronous motors (for example, electrically actuated by the open loop controller 4), require frequency converters for the closed-loop rotational speed control. The concepts described here can be implemented with a variety of different types of grinding machines, polishing machines and other machines for surface machining.

Figure 2:
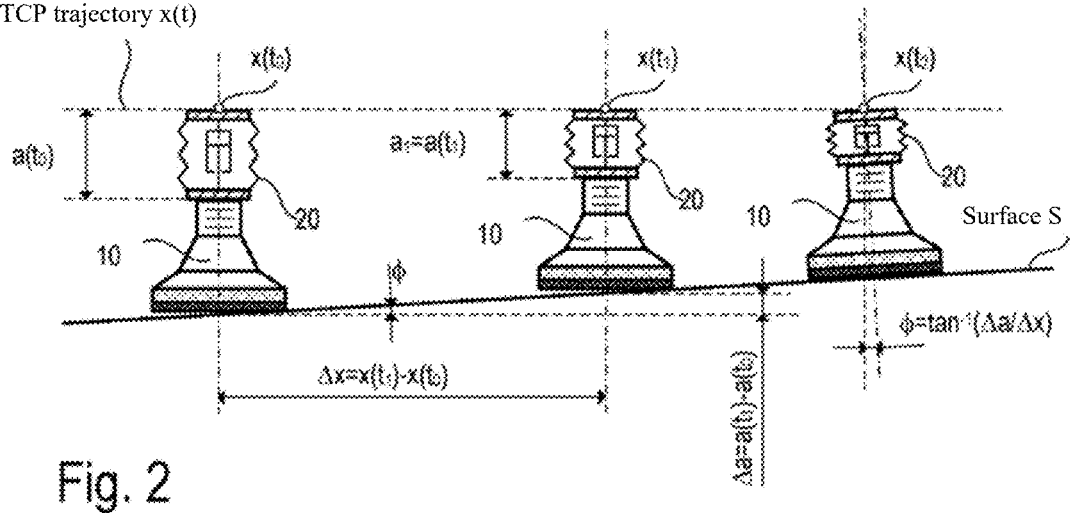
FIG. 2 illustrates, using an example, the compensation of an angular error of the orientation of the tool center point (TCP) of a robot-assisted grinding device relative to the workpiece surface by adjusting the TCP.

As mentioned above, the manipulator 1 moves the TCP (and thus the grinding machine 10) along a predefined trajectory, which follows the surface (contour) of the workpiece. In practice, situations can occur, in which the TCP does not accurately follow the surface and angular deviations occur. These angular deviations can, on the one hand, be the consequence of positional tolerances of the workpiece 40 or of (intentionally or unintentionally) inaccurate programming of the trajectory. FIG. 2 shows an example of a situation in which the trajectory x(t) is not parallel to the workpiece surface but tilted by an angle $\phi$. Thus, the TCP is also tilted relative to the surface normal by the angle $\phi$, i.e., the effective direction of the actuator 20 is not perpendicular to the workpiece surface but at an angle of 90°−$\phi$. According to FIG. 1, at time to and TCP position $x(t_0)$, the actuator 20 has a displacement of $a(t_0)$. At time $t_1$, the TCP (and thus the entire grinding machine 10 together with the actuator 20) has moved further to position $x(t_1)$, which means a shift of $\Delta x = x(t_1) - x(t_0)$. As a result of the tilting by the angle $\phi$, the displacement of the actuator 20 has been reduced by $\Delta a$ ($\Delta a = a(t_1) - a(t_0)$). The values $\Delta x$ and $\Delta a$ are known to the robot control, and thus the angle of the (local) tilt between the workpiece surface and the TCP trajectory can be calculated:

$$\phi = \tan^{-1}(\Delta a / \Delta x). \tag{1}$$

Alternatively, measurement of the angle is also possible, for example, by measuring the distance between the TCP and the workpiece surface on opposite sides of the grinding machine. From the difference of the measured distances, the tilting angle can be determined. However, as mentioned above, a measurement is not absolutely necessary, since the angle can be calculated from variables (e.g., $\Delta a$ and $\Delta x$), which are already known to the robot control. In the example mentioned at the beginning, in which the function of the linear actuator (compensation device) is provided by the manipulator itself, the robot control "knows" both variables $\Delta a$ and $\Delta x$, since, in fact, the component of the movement carried out by the linear actuator in this case must be performed by the robot itself.

As mentioned, the angle $\phi$ of tilt between the workpiece surface and the TCP trajectory is equal to the angular deviation of the effective direction of the actuator 20 (and thus of the direction of the process force) from the surface normal. After calculating the angular deviation $\phi$ (e.g., according to equation 1), the robot control can correct the pose of the TCP, such that the process force acts at a right angle on the surface. This situation is shown on the right in FIG. 2, in which the TCP was further moved into position $x(t_2)$ and the angular deviation $\phi$ was corrected. FIG. 2 shows a simplified example with a one-dimensional robot movement. This angular correction can also occur in multiple directions in space.

Figure 3:
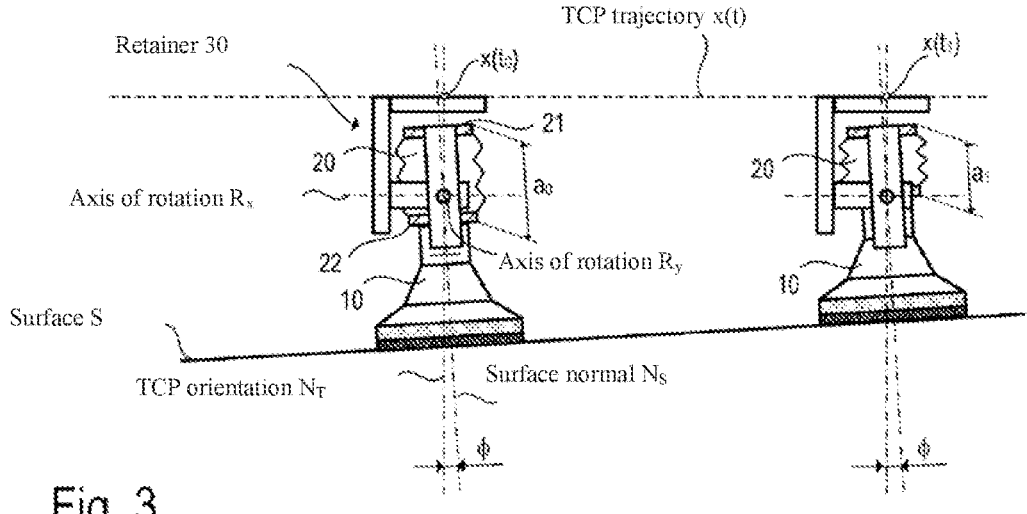
FIG. 3 illustrates, using an example, the compensation of an angular error of the orientation of the tool center point (TCP) by means of a cardan joint, so that no adjustment of the TCP is necessary.

FIG. 2 illustrates the "active" determination and correction of angular deviations by the robot control. The example in FIG. 3 illustrates a "passive" approach, in which the grinding machine 10 (including the actuator 20) is "suspended" on the actuator such that it can be pivoted in order to orient the TCP. For example, a retainer 30 with a type of cardan joint may be used for the suspension, in order to enable tilting in two directions (in advance direction and transversely to the advance direction, i.e., along the trajectory and transverse thereto). Because the actuator 20 presses the grinding machine 10 and thus the grinding wheel 11 with a defined (actuator) force against the surface of the workpiece 40, the grinding machine 10 will align itself "automatically" (passively, without active positioning) parallel to the surface normal $N_S$, such that the contact force $F_K$ acts perpendicularly on the surface. Angular errors can thus be compensated, without the awareness of the robot control; the TCP orientation $N_T$ can here remain unchanged and does not have to be actively adapted. Changes of the normal distance between the surface and the TCP are also "automatically" compensated by the actuator 20 and the closed-loop force control, since the closed-loop force control always controls the actuator 20, such that the contact force $F_K$ corresponds to a target force.

Figure 4:
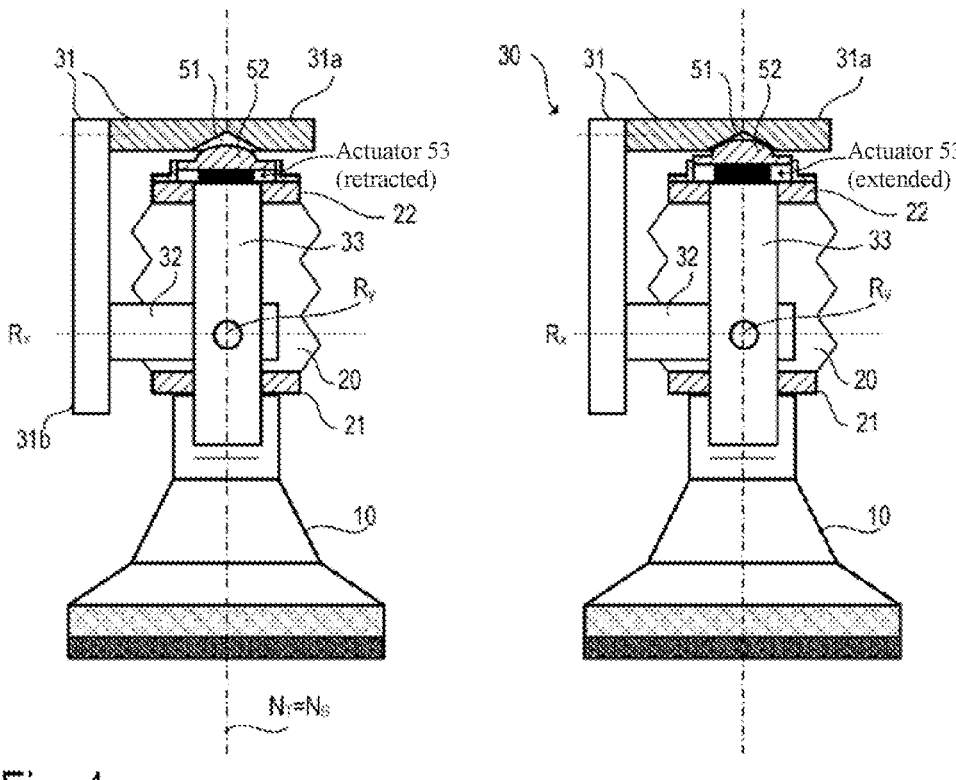
FIG. 4 shows in more detail an example of a coupling of a grinding machine to the TCP of a manipulator according to FIG. 3, wherein the coupling occurs via a retainer with a cardan joint which can be locked.
Figures 5, 6:
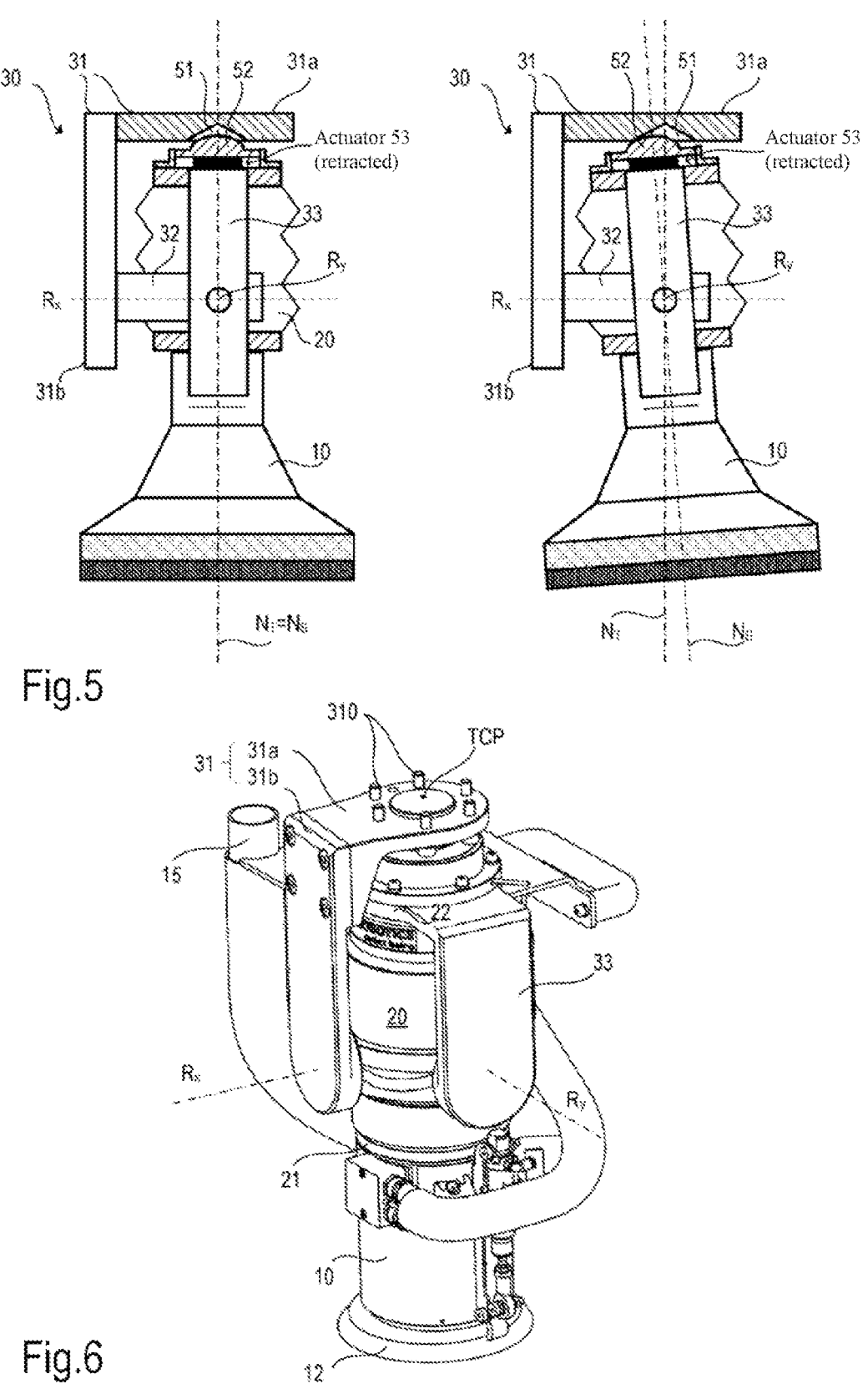
FIG. 5 shows the example of FIG. 4 with unlocked cardan joint and tilted grinding machine.
FIG. 6 illustrates an isometric representation of another example of a robot-assisted grinding device with a cardan joint for compensation of angular errors.

The coupling of the TCP of the robot with the assembly comprising the grinding machining 10 and the actuator 20 is shown in FIGS. 4 and 5 in greater detail. As mentioned, this coupling occurs by means of a retainer 30 which has a type of cardan joint, whereby the grinding machine 10 together with the actuator 20 can be tilted relative to the orientation $N_T$ of the TCP about two axes $R_x$, $R_y$, wherein, in a zero position (no tilting), the two axes $R_x$, $R_y$ are perpendicular to one another, and both axes $R_x$, $R_y$ are perpendicular to the orientation $N_T$ of the TCP. According to the example shown, the retainer 30 has an L-shaped bracket 31, wherein a base plate 31a and a side arm 31b form the two arms of the mounting bracket 31. The base plate 31a is rigidly connected to the TCP of the robot 1 (e.g., by screw connections), wherein the side arm 31b (in the non-tilted state) is substantially parallel to the orientation $N_T$ of the TCP. In this case, the upper side of the base plate is in contact with the front side of the arm segment 2a of the robot 1, whereas, in the example according to FIG. 1, the upper mounting plate 22 (flange) of the actuator 20 is coupled directly to the manipulator. In the example shown, the side arm 31b and the base plate 31a enclose a right angle.

The first axis of rotation $R_x$ of the aforementioned cardan joint extends through the side arm 31*b*, on which another bracket 32 is rotatably mounted (about the axis of rotation $R_x$). A first arm of the mounting bracket 32 (not shown in FIGS. 4 and 5) is mounted rotatably on the side arm 3; and a third mounting bracket 33 (or a mounting bar) mounted rotatably (about the axis of rotation $R_y$) on the second arm of the mounting bracket 32 which protrudes at a right angle from the side arm 31*b*. The third mounting bracket 33 can thus be tilted both about the axis of rotation $R_x$ and about the axis of rotation $R_y$, whereby a cardan joint is formed. The actuator 20 is connected by its upper mounting plate 22 to the mounting bracket 33 in such a way that (in the non-tilted state) the effective direction of the actuator 20 (and thus also the axis of rotation of the grinding wheel 11) is coaxial to the orientation $N_T$ of the TCP. The grinding machine 10 is connected to the lower mounting plate 21 (flange) of the actuator 22 (e.g., by means of a screw connection). The axes of rotation $R_x$ and $R_y$ intersect with one another below the base plate 31*a*. According to the example shown, the intersection of the axes of rotation $R_x$ and $R_y$ can lie above the grinding machine 10, i.e., inside the actuator 20. In other examples, the intersection can lie lower, that is to say inside the grinding machine 10.

As shown in FIG. 3, the grinding machine 10 can conform "automatically" to the workpiece surface by tilting about the axes of rotation $R_x$ and $R_y$ when the grinding machine 10 is pressed with the grinding wheel 11 against the workpiece surface. However, there are situations in which this tilting is undesirable. According to the example shown in FIGS. 4 and 5, between the upper side of the actuator 20 (upper mounting plate 22) and the lower side of the base plate 31*a*, a locking mechanism is provided, which is suitable for locking the retainer 30, such that tilting about the axes of rotation $R_x$ and $R_y$ is no longer possible and the grinding machine 10 is rigidly (non-movably/tiltably) coupled to the TCP of the robot 1.

According to the example shown in FIGS. 4 and 5, the locking mechanism has an actuator 53 secured, for example, to the upper side of the actuator 20 and comprising a latch. This latch is designed to engage—in an extended state of the actuator 53—in a corresponding recess 51 in the lower side of the base plate 31*a* and thereby secure the actuator 20 on the base plate 31*a*. The actuator 53 can be, e.g., a pneumatic actuator or a solenoid actuator which is suitable for moving the latch 52 back and forth between a retracted end position (unlocked state) and an extended end position (locked state).

The recess 51 can have a symmetric shape with respect to the longitudinal axis of the actuator 20 (and the axis of rotation of the grinding machine 10 in the non-tilted state). For example, the recess can have a conical, cylindrical or pyramidal shape or the shape of a spherical segment (concave shapes). Likewise, the latch 52 has a symmetric (convex) shape (e.g., cylindrical, spherical segment, pyramidal, etc.). The specific shape is unimportant; however, the symmetric form of recess 51 and latch 52 can be designed such that the actuator 20 and the grinding machine 10 (i.e., its axis of rotation) are "automatically" oriented coaxially to the TCP (normal vector $N_T$), when the actuator 53 pushes the latch 52 into the recess 51. Accordingly, the locking mechanism is self-aligning.

In the left portion of FIG. 4, the device is shown in its unlocked state (i.e., the actuator 20 and the grinding machine 10 can be tilted); in the right portion of FIG. 4, the device is shown in the locked state (i.e., the actuator 20 and the grinding machine 10 are rigidly coupled to the TCP). Locking can be desirable particularly in situations in which the grinding wheel 11 is intentionally not to rest tangentially on the workpiece surface, for example, during the grinding of small edges. Moreover, locking can be desirable when the robot 1 moves the grinding machine 10 into a switching station in order to remove the grinding disk 11 and install a new grinding wheel 11. Suitable switching stations for automatically switching grinding disks 11 are known per se.

The latch 52 and the recess 51 can also be shaped such that the edges of the recess 51 for the latch 52 form a stop collar which limits the tilt angle $\phi$ to a maximum tilt angle $\phi_{MAX}$. The left portion of FIG. 5 is practically identical to the left portion of FIG. 4. The right portion of FIG. 5 shows the grinding machine 10 and the actuator 20 in a tilted position in which the latch 52 rests against an edge of the recess 51 (which forms the mentioned stop collar). In the situation shown, the tilt angle equals the maximum tilt angle $\phi_{MAX}$.

FIG. 6 is an isometric illustration of an additional example of a robot-assisted grinding device with a cardan joint for compensating angular errors. The grinding machine 10 with the support disk 12 on which a grinding disk can be mounted is shown. The grinding machine 10 is connected to the lower mounting plate 21 of the actuator 20 (for example, by screw connections); on the upper mounting plate 22 of the actuator 20, a first arm of the mounting bracket 33 is connected (e.g., also by means of screw connections). A second arm of the mounting bracket 33 is pivotably connected about the axis of rotation $R_y$ to the mounting bracket 32 (in FIG. 6 covered by the actuator 20, see FIG. 5), and the mounting bracket 32 is in turn pivotably connected about the axis of rotation $R_x$ to the side arm 31*b* of the mounting bracket 31. The base plate 31*a* of the mounting bracket 31, in the non-tilted state, is substantially parallel to the mounting plate 22 of the actuator 20. The two axes of rotation $R_x$ and $R_y$ may include a right angle, whereby a cardan joint is formed, as already described in reference to FIGS. 4 and 5. As shown in FIG. 6, on the mounting bracket 31 (e.g., on the side arm 31*b*), one or more tubes and/or cables can be secured, which are connected on the grinding machine 10. The tube 15 shown in FIG. 6 can, e.g., be used for extracting dust. The cables are used, among other things, for supplying the electric motor of the grinding machine. FIG. 6 also shows the screws 310, by means of which the mounting bracket 31 can be secured on the TCP of a manipulator.

Figure 7:
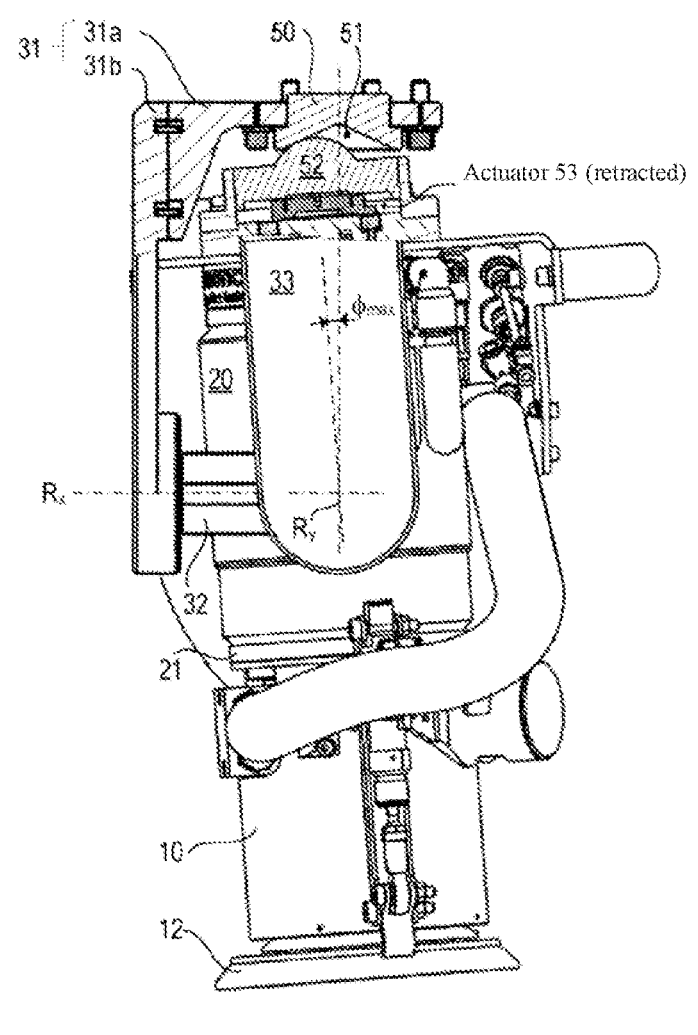
FIG. 7 is a cross-sectional representation for illustrating a locking device (in the unlocked state) for securing the cardan joint in the embodiment example according to FIG. 6.
Figure 8:
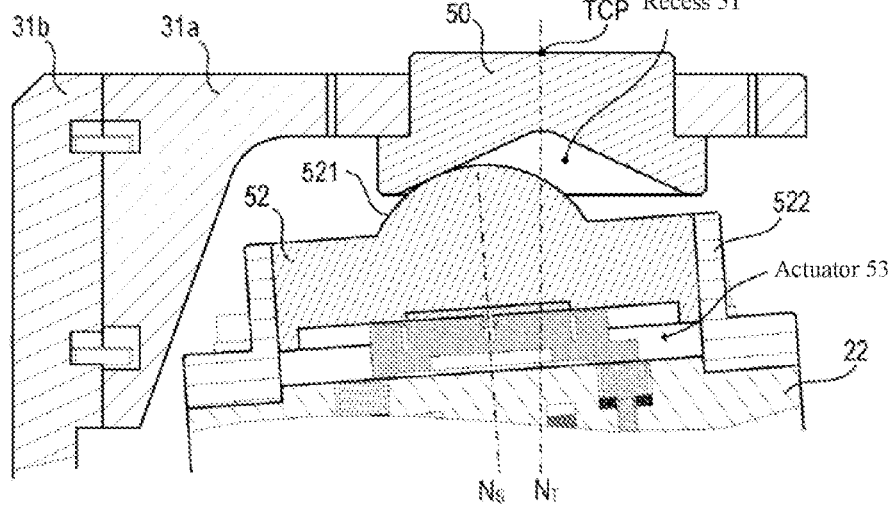
FIG. 8 shows the locking device of FIG. 7 in more detail.

FIG. 7 illustrates the device from FIG. 6 in a side view, with a partial longitudinal section, so that the locking mechanism already described above in reference to FIGS. 4 and 5 is visible. Moreover, in this view, the mounting bracket 32 is visible. FIG. 8 is an enlarged view of the upper portion of FIG. 7. In the situation shown, the actuator 53 is retracted and the latch 53 is therefore in its lower end position. The grinding machine 10 and actuator 20 are tilted by the maximum angle $\phi_{MAX}$ about the axis $R_y$, so that the (symmetric and convex) bulge 521 of the latch 52 is in contact with an edge of the (concave) recess of the component 50. For manufacturing reasons, in this example, the recess 51 is not located directly in the base plate 31, but instead is in the component 50, which forms the counterpart to the latch 52 and which is connected to the base plate 31*a*. However, in other embodiments, the counterpart 50 and the base plate 31*a* can be an integral component. However, in some applications, it can be useful to design the component 50 with the recess 51 such that is can be exchanged, in order to use the device with different components 50 each with differently shaped recesses 51. By varying the component 50, e.g., the maximum tilt angle $\phi MAX$ can be adjusted. Furthermore, the device can be operated with different actuators 20 and grinding machines 10 if the geometry of the component 50 can be adapted to the dimensions of the actuator 20 and the grinding machine 10.

Figure 9:
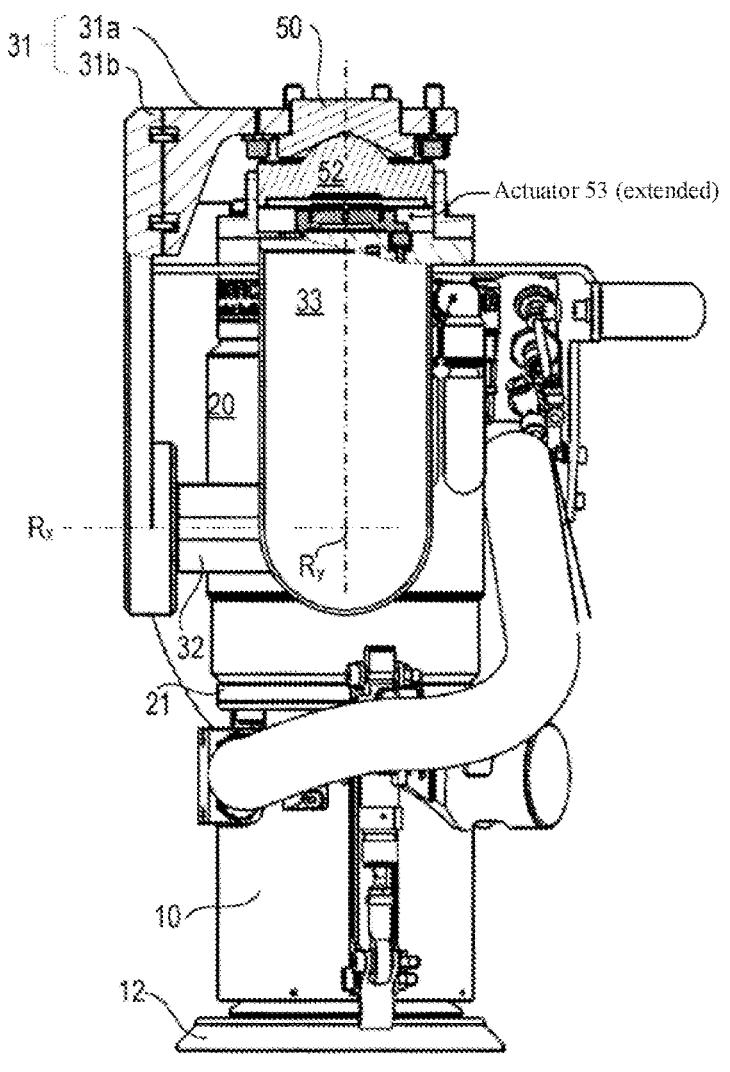
FIG. 9 shows the example of FIG. 7, wherein the locking device locks the cardan joint, such that tilting of the grinding machine relative to the TCP is impossible.

FIG. 9 shows the same example as in FIG. 7, wherein the actuator 53 is extended and the latch 52 engages in the recess 51 of the component 50 in such a way that a tilting movement of the grinding machine 10 and of the actuator 20 is no longer possible. In this state, the grinding machine 10 and actuator 20 are rigidly coupled to the TCP of the robot 1.

FIG. 7 to 9 also clearly show that the intersection of the axes of rotation $R_x$ and $R_y$ lies clearly below the base plate 31*a* inside the actuator 20 or inside the grinding machine 10. During operation (i.e., when the grinding machine is in contact with the workpiece surface, the longitudinal axis of the grinding machine 10 (and thus also the direction of action of the actuator 20) is directed perpendicularly to the workpiece surface, and a tilt angle $\phi < \phi_{MAX}$ between the surface normal $N_S$ and the orientation $N_T$ of the TCP is set. If the tilt angle reaches the maximum value $\phi_{MAX}$, it is no longer ensured that the longitudinal axis of the grinding machine 10 is substantially perpendicular to the workpiece surface (and thus the grinding wheel rests tangentially on the surface).

In some applications, it may be useful to measure the tilt angle about the axes of rotation $R_x$ and $R_y$, and/or to detect when the maximum angle $\phi_{MAX}$ has been reached and the latch 52 contacts the component 50. Based on this information, the robot control can take various measures such as, for example, raising the grinding machine until the contact between the grinding tool and the workpiece surface is released. For this purpose, for example, angle sensors can be coupled to the rotational joints with the axes of rotation $R_x$ and $R_y$, which angle sensors deliver the information on the actual tilt angles to the control 4. The angle sensors are not shown in the figures. However, it is known to a person skilled in the art how to measure, on a rotational joint, the angle included by the rotating parts, which is why the sensor system is not discussed further here.

Moreover, it should be noted that it is possible to combine the "active" approach according to FIG. 2 and the "passive" approach according to FIG. 3-5. This means that, in a device according to FIG. 3, the robot control can also always subsequently readjust the orientation of the TCP in such a way that the tilt angles $\phi$ remain below a predefinable threshold. This means that, before the tilt angle $\phi$ reaches the maximum tilt angle $\phi$MAX (and the bulge 521 abuts against an edge of the recess 51, see FIG. 8), the robot control can adjust the TCP in order to reduce the tilt angle $\phi$. If the tilt angles are known (e.g., on the basis of a measurement), then the tilt angles $\phi$ can be adjusted to approximately zero (taking into consideration unavoidable tolerances). In order to avoid constant readjustment of the TCP, the control 4 can be designed to reduce the tilt angle $\phi$ by adjusting the TCP only when the measured angle $\phi$ has reached a threshold OR, wherein the threshold $\phi$R can be smaller than the maximum angle $\phi_{MAX}$.

The invention claimed is:

1. A device, comprising:
   a retainer with a base plate configured to be mounted on a manipulator; and
   an assembly suspended on the retainer and comprising a machine tool,
   wherein the retainer has a tilt mechanism which couples the assembly to the retainer, such that the assembly is tiltable relative to the base plate about two axes of rotation, wherein the tilt mechanism is lockable, such that a tilting is blocked and the assembly is rigidly coupled to the base plate in a locked state.

2. The device of claim 1, wherein the two axes of rotation are substantially perpendicular to one another and intersect.

3. The device of claim 1, wherein the tilt mechanism has a cardan joint which enables tilting of the assembly relative to the base plate about the two axes of rotation.

4. The device of claim 1, wherein the assembly further comprises a force measuring system configured to measure the force exerted by the machine tool on a workpiece surface.

5. The device of claim 1,
   wherein the tilt mechanism has a stop collar, such that tilting about the two axes of rotation is only possible up to defined maximum angles.

6. The device of claim 1, wherein the retainer has a first mounting bracket, a second mounting bracket, and a third mounting bracket, which are mechanically coupled to one another, such that the second mounting bracket is tiltable relative to the first mounting bracket about a first of the two axes of rotation and the third mounting bracket is tiltable relative to the second mounting bracket about a second of the two axes of rotation, wherein the assembly is rigidly mounted on the third mounting bracket and the base plate is part of the first mounting bracket.

7. The device of claim 1, wherein the assembly further comprises a compensation device coupled to the machine tool and configured to compensate for changes in the position of the retainer relative to a workpiece surface.

8. The device of claim 7, wherein the compensation device is a linear actuator or a spring.

9. The device of claim 1, further comprising:
   sensors configured to determine the tilt angle associated with the two axes of rotation.

10. A system, comprising:
   a manipulator;
   the device of claim 9 coupled to a TCP (tool center point) of the manipulator;
   an controller configured to control a movement of the TCP of the manipulator,
   wherein the controller is configured to adapt an orientation of the TCP based on the angles measured by the sensors.

11. The device of claim 1, further comprising:
   a locking mechanism configured to secure the assembly on the base plate, such that a tilting is no longer possible.

12. The device of claim 11, wherein the locking mechanism has an actuator, a latch, and a component with a recess, which are designed such that the latch can be pushed into the recess by the actuator.

13. The device of claim 12, wherein the component with the recess is an integral part of the base plate or rigidly connected to the base plate.

14. The device of claim 12, wherein in an unlocked state, side surfaces of the recess form a stop collar which limits possible tilting about the two axes of rotation to defined maximum angles.

15. The device of claim 11, wherein the locking mechanism is configured such that, in an unlocked state, tilting of the assembly about the two axes of rotation is allowed for tilt angles less than a maximum angle associated with the axis of rotation.

16. The device of claim 15, wherein the locking mechanism has a stop collar which prevents tilt angles greater than the maximum angle.

17. A system, comprising:

a manipulator;

an assembly comprising a machine tool and coupled to a TCP (tool center point) of the manipulator; and a controller configured to control a movement of the TCP of the manipulator, wherein the controller is designed:

to determine an angular deviation between a longitudinal axis of the machine tool and a normal of a workpiece surface, while a tool mounted on the machine tool is contacting the workpiece surface; and based on the determined angular deviation, to adjust the orientation of the TCP such that the angular deviation is reduced, wherein the assembly has a linear actuator coupled to the machine tool, wherein the controller is further configured to calculate the angular deviation based on a shift of the TCP and an associated change of the displacement of the linear actuator.

* * * * *